Feb. 6, 1934.  A. G. McCALEB  1,946,226
PARKING LIGHT CONTROL FOR AUTOMOTIVE VEHICLES
Filed March 3, 1930  3 Sheets-Sheet 1
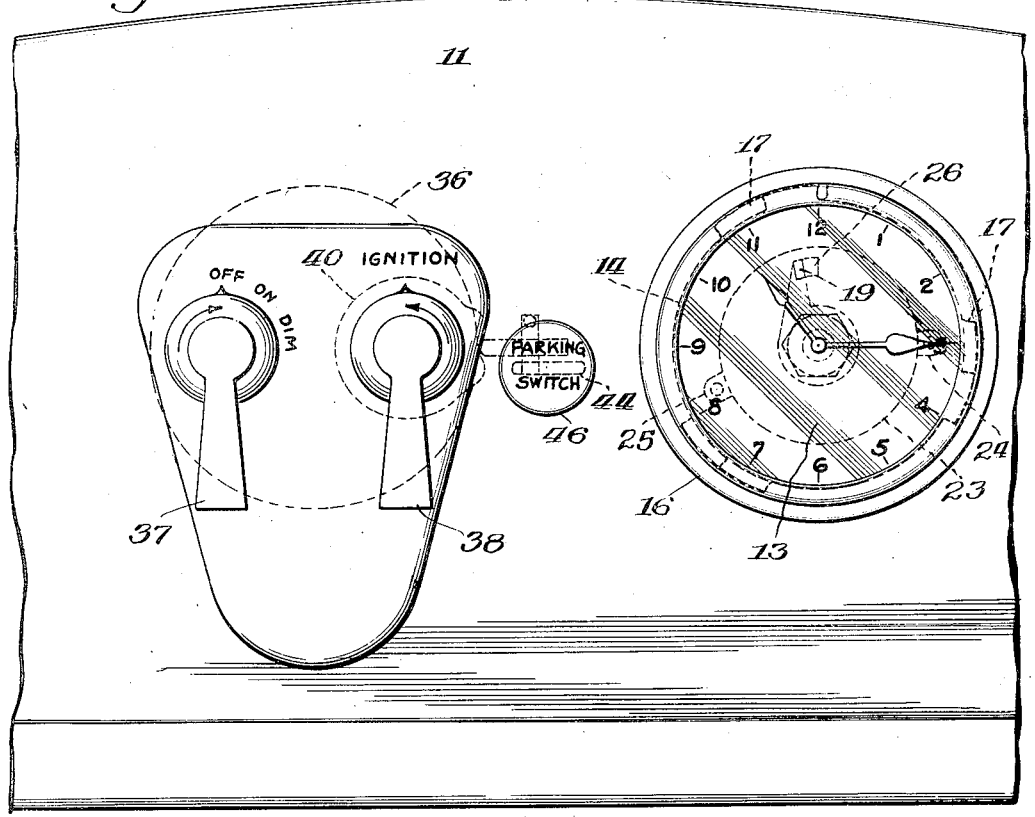
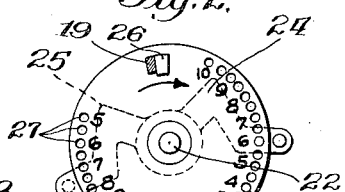
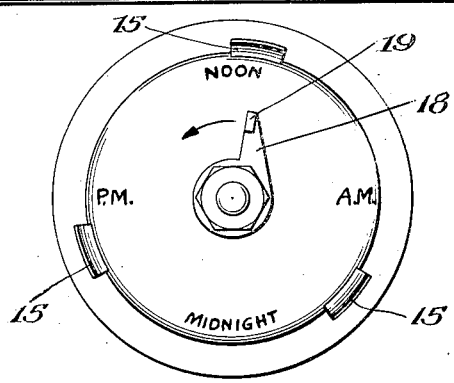
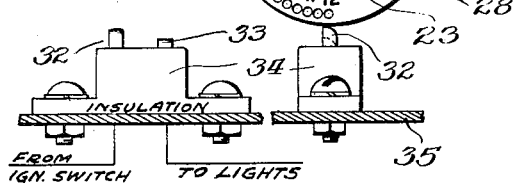
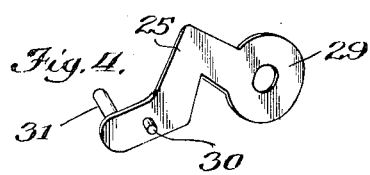
Inventor
Albert G. McCaleb,
By Williams Bradbury
McCaleb & Hinkle
Attys.

Feb. 6, 1934.  A. G. McCALEB  1,946,226
PARKING LIGHT CONTROL FOR AUTOMOTIVE VEHICLES
Filed March 3, 1930  3 Sheets-Sheet 2
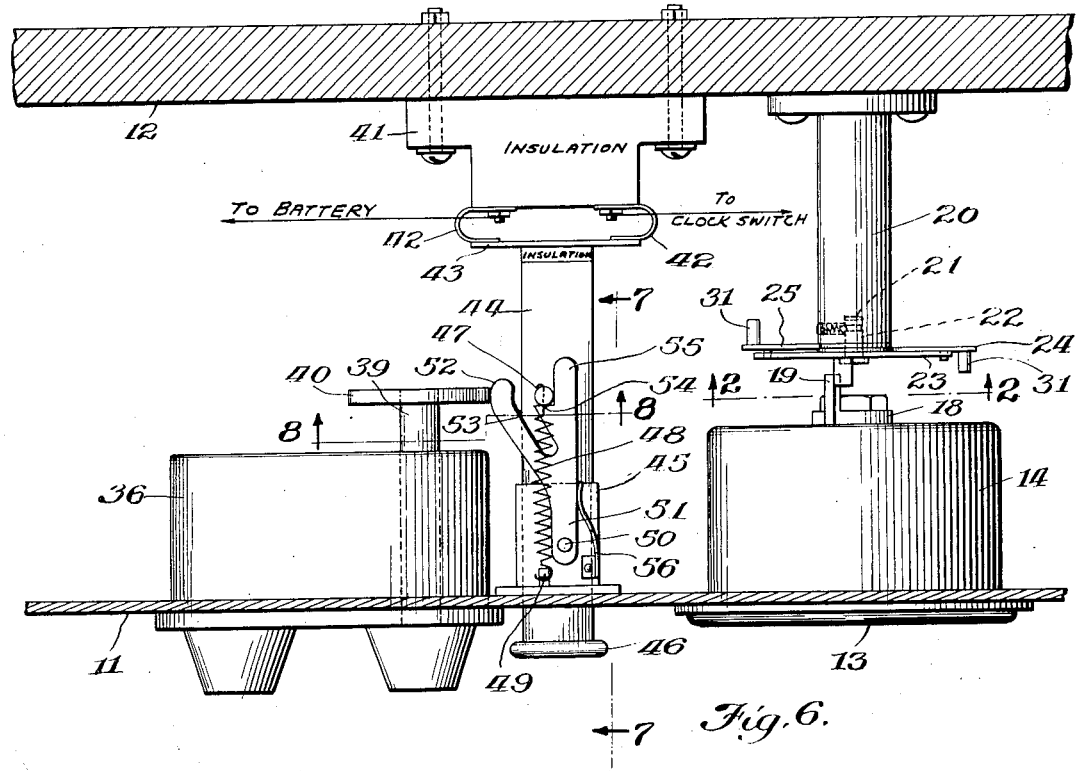
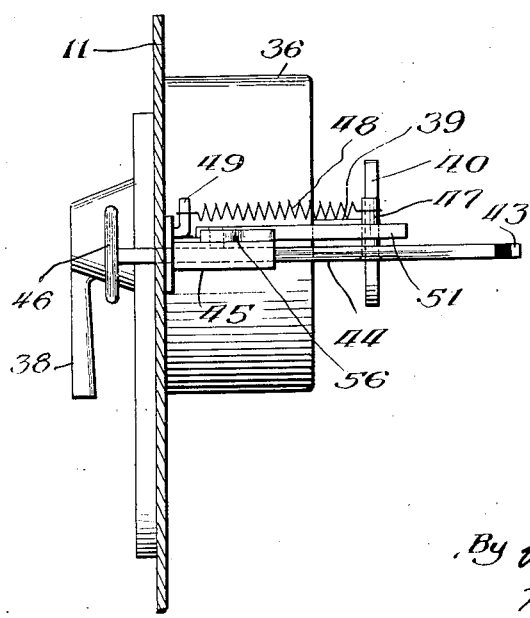
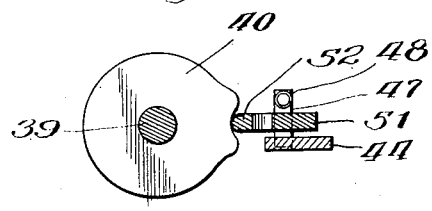
Inventor
Albert G. McCaleb
By Williams, Bradbury,
McCaleb & Hinkle,
Attys

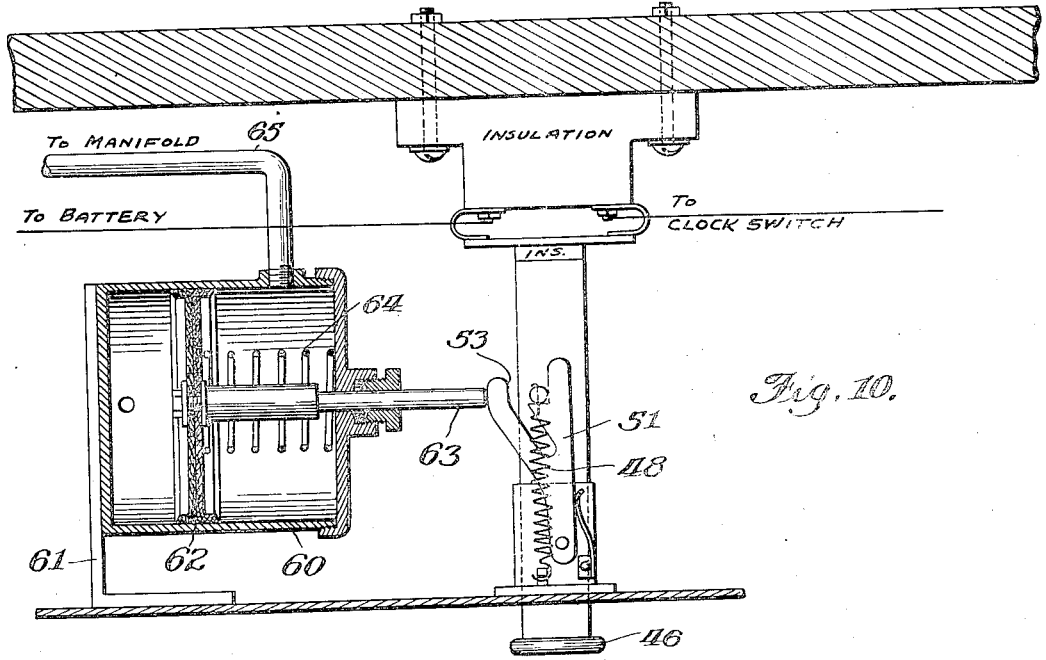
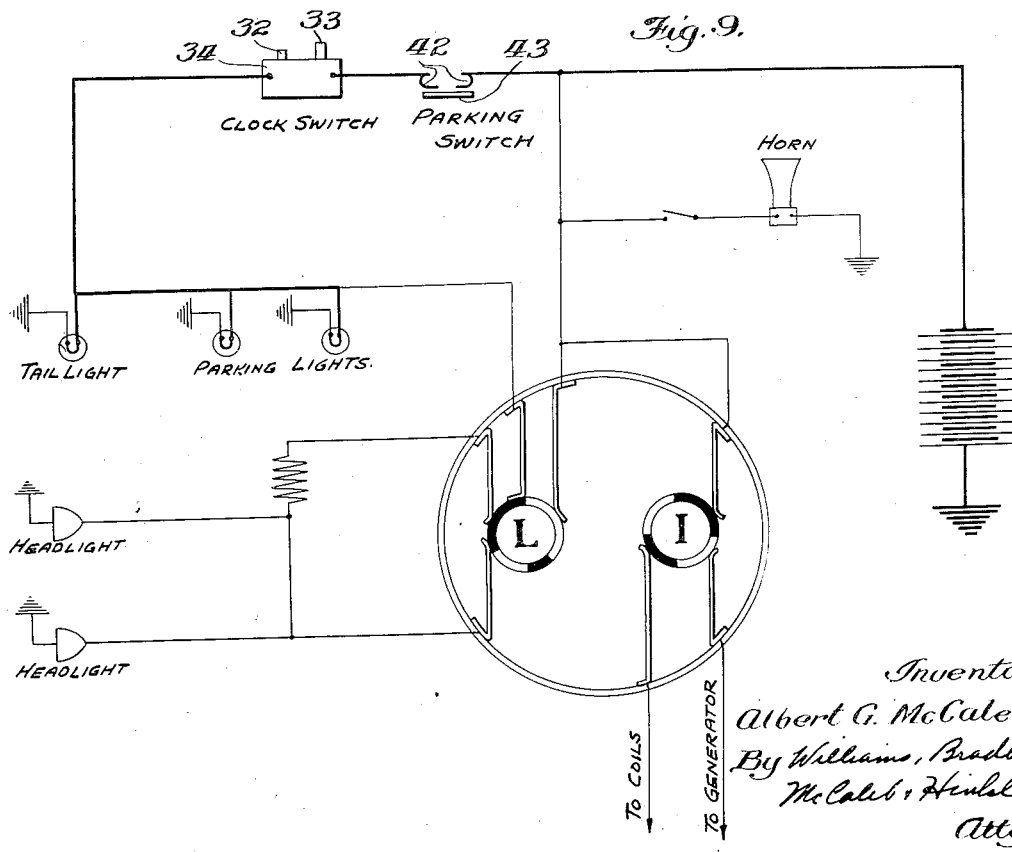

Patented Feb. 6, 1934

1,946,226

UNITED STATES PATENT OFFICE 1,946,226

PARKING LIGHT CONTROL FOR AUTOMOTIVE VEHICLES

Albert G. McCaleb, Evanston, Ill.

Application March 3, 1930. Serial No. 432,933

6 Claims. (Cl. 161—1)

My invention provides a parking light control which is so consctructed and arranged that the driver of an automotive vehicle, on parking at an hour when parking lights are not required, by a simple volitional act may insure that the parking lights will be turned on at the proper pre-determined time if the vehicle remains parked until that pre-determined time, with the assurance, moreover, that if the vehicle is operated after the performance of the volitional act aforesaid, the parking lights will not subsequently be turned on except pursuant to the re-performance of that volitional act. In other words, the driver of the vehicle on parking may set the devices of the present invention to turn on the parking lights at the hour required by law, or by good judgment, and then be assured that if the vehicle be driven to and left in a garage after such parking, the parking lights will not be turned on in the garage,—this without the driver giving the devices of the parking light control any attention on the way to or in the garage.

In the accompanying drawings, wherein I have shown two illustrative embodiments of my invention, Fig. 1 is an elevational view, from the driver's position, of a portion of the instrument board of a vehicle equipped with the improvements of the present invention;

Fig. 2 is a detailed view, partly in section and partly in elevation, which may be regarded as taken on the line 2—2 of Fig. 6 and looking in the direction indicated by the arrows;

Fig. 3 is a detailed view, taken at right angles to Fig. 2, of the push button switch also shown in Fig. 2;

Fig. 4 is a detailed view in perspective of one of the adjustable arms for operating the buttons of the aforesaid push button switch;

Fig. 5 is a rear elevational view of the clock;

Fig. 6 is a top plan view of the parts shown in Fig. 1, together with their associated and co-operating mechanism which lie in front of the instrument board;

Fig. 7 is a view, in elevation of all of the parts shown except the instrument board, which may be regarded as taken on the line 7—7 of Fig. 6;

Fig. 8 is a detailed view, partly in section and partly in elevation, taken on the line 8—8 of Fig. 6 and looking in the direction indicated by the arrows;

Fig. 9 is a diagram of a circuit arrangement in which the devices of the present invention may be placed; and Fig. 10 is a view generally similar to Fig. 6, illustrating a modification of the invention wherein the volitionally operable switch for placing the parking lights under the control of the time keeping mechanism is automatically released by the operation of the engine itself, as distinguished from being released by the act of moving the ignition switch from its "off" to "on" position, as is the case in that embodiment of the invention shown in the preceding figures.

Similar characters of reference refer to similar parts throughout the several views.

In the drawings, reference numeral 11 indicates what may be regarded as a conventional instrument board, and 12 a suitable stationary supporting board or panel which may be regarded as lying under the cowl of the vehicle and being spaced from and normally concealed by the instrument board.

Supported by the instrument board is a clock 13, the casing of which is shown at 14, the clock being retained in operative position on the panel board in any suitable manner, as for instance by a plurality of lugs 15, 15 on the clock casing, which are adapted to be passed through slots in and engaged behind a clock retaining ring 16 carried by the instrument board. The slots of the ring 16 through which the lugs 15 pass prior to being turned to the position shown in Fig. 1, are indicated at 17, 17.

The details of the clock mechanism are not important and have not been illustrated, the only essential requirement, so far as the time controlled switching mechanism here shown is concerned, being that the clock be provided at its rear face with an arm 18, which makes one revolution in the direction of the arrow (Fig. 5) each twenty-four hours. The arm 18 is provided with a rearwardly projecting finger 19, the function of which presently will appear.

Carried by the supporting panel 12 and projecting rearwardly therefrom with its axis in alignment with the axis of the clock crank 18 is a post 20, having at its rear end an axial bore 21 adapted to receive a headed pin 22, which constitutes a journal for rotatable disc 23 and push button operating arms 24 and 25.

Any suitable means may be provided for preventing the pivot pin 22 from shaking out of the bore 21,—for instance a spring pressed ball carried by the post 20 engaging yieldingly in an annular groove in the pin, as shown in Fig. 6.

The disc 23 is driven by the clock crank 18 in the direction of the arrow (Fig. 2) by reason of the fact that the crank finger 19 of the clock engages a lug 26 pressed from the metal of the disc. The disc 23 is provided, near its periphery, with two sets of apertures 27 and 28, some or all of which apertures may be suitably numbered to indicate the hours of the day and night to which they correspond.

Each of the arms 24 and 25 is provided with a hub portion 29 to receive the pivot pin 22, and is moreover provided with small and large pins 30 and 31. The pin 30 in each case is adapted to engage one of the peripheral apertures of the clock driven disc 23, while the pin 31, in each case, is adapted to operate one of the push buttons 32 or 33 of a suitable push button switch mechanism 34, which is suitably supported beneath the disc 23 and the arms 24 and 25 by a bracket 35, which may be attached to either the instrument board 11, the supporting panel 12, or both.

It will be noted that the pin 30 of the arm 25 projects forwardly from its arm, while the pin 31 of the arm 24 projects rearwardly from its arm. The said pin 31 of arm 24 is intended to engage and depress the switch button 32, while the pin 31 of arm 25 is adapted similarly to depress push button 33.

The upper ends of the buttons 32 and 33 may be slightly rounded, as indicated in Fig. 2, to facilitate their operation by the pins 31. And it will also be understood by persons familiar with push button switches, that each of the switch buttons will rise automatically when the other is depressed.

For the purposes of description, it may be assumed that the buttons 32 and 33 of the switch are in the positions corresponding to the "off" or open circuit condition of the switch, but that the switch will be placed in circuit closing position when the pin 31 of the arm 24 engages and depresses the button 32.

That one of the apertures 27 of the disc 23 in which the pin 30 of the arm 24 engages, determines the hour of the afternoon or evening at which the switch 34 will be operated to circuit closing position. Similarly, the disc aperture 28 in which the pin 30 of the arm 25 engages will determine the hour of the morning or forenoon at which the switch 34 will be operated to circuit opening condition.

Thus, for instance, if the parking laws of the community require that lights on parked cars be displayed between 6:00 P. M. and 7:00 A. M., the pins 30 of the arms 24 and 25 will be placed respectively in the "6" and "7" apertures of the groups 27 and 28.

Bearing in mind that the time keeping mechanism just described will keep the switch 34 in circuit closing condition during those hours of the evening and the morning when parked cars should display lights, and will keep such switch in open circuit condition during the hours when parking lights are not required or desired, I shall proceed with the description of the other parts of the apparatus necessary to the accomplishment of the purposes of this invention.

Mounted at the usual or any convenient point on the instrument board is a light and ignition switch mechanism comprising a housing 36, and suitable switch levers 37 and 38 adapted to be moved in the directions indicated by their respective arrows to perform their usual functions in a well known manner.

In accordance with the present invention, however, the ignition switch lever 38 has an additional function made possible by the fact that its shaft 39 is provided with a cam 40 which occupies the position indicated by Figs. 1 and 8 when the ignition switch lever is in the "off" position. The function of the cam 40 is to co-operate with mechanism presently to be described, to permit the parking lights to be placed under control of the time operated switch 34 when the ignition switch lever is in its "off" position, and to insure that the parking lights are taken from under the control of the time operated switch 34 whenever the switch lever 38 is moved to its "on" position.

Mounted upon the supporting panel 12 is a suitable insulating block 41 carrying a pair of spring contacts 42 adapted to be engaged and electrically connected by a switch bar 43, which is carried upon and electrically insulated from a bar 44. The bar 44 is mounted in a sliding bearing 45 for reciprocation in a line at right angles to the instrument board 11, the said bar extending through an aperture in the instrument board and being provided with a push button 46 accessible to the driver.

It will be noted that the bar 44 carries a pin 47, which is engaged by one end of a tension spring 48 having its other end attached to a lug 49 carried by the bearing member 45. The spring 48 thus always tends to move the switch bar 43 out of engagement with the spring contacts 42.

Pivoted at 50 to the bearing member 45 is a substantially Y-shaped latching member 51 having a releasing arm 52, a cam slot 53, a stop shoulder 54 and a stop finger 55.

A leaf spring 56 carried by the bearing member 45 at all times urges the latching member 51 in a counterclockwise direction (Fig. 6).

In Fig. 6 the button 46 is shown in its depressed or circuit closing position and is there retained by reason of the fact that the stop shoulder 54 of the latch 51 lies behind the pin 47. Under these conditions, the releasing arm 52 of the latch engages in the depression of the cam 40 associated with the ignition switch.

Under the conditions depicted in the drawings, the operation of the time controlled switch 34 to circuit closing position at the appointed hour, will result in the lighting of the parking lights of the car, for the reason that the control of the parking lights by the time operated switch 34 is established through spring contacts 42. Therefore, it may be assumed that the vehicle has been parked and that at the time of parking, the driver has depressed the button 46 to place the parking lights under the control of the time operated switch 34 until the vehicle is next operated. When the vehicle is next operated, the ignition switch, as an incident to the starting of the vehicle, is necessarily moved in the counterclockwise direction (Fig. 1). Upon this movement of the switch lever, the cam 40 moves the releasing arm 52 of the latch 51 to the right (Fig. 6) to a position where the pin 47 is aligned with the slot 53, thereby releasing the pin 47 and hence the bar 44. When the bar 44 is thus released it is, under the action of the spring 48, withdrawn outwardly, the pin 47 traveling in the cam slot 53, and carries with it the switch bar 43. This withdrawal of the switch bar 43 from the contacts 42 electrically disconnects the contacts.

When the car is next parked, the driver may, if he desires, again place the parking lights under the control of the time operated switch 34 by depressing button 46. Under these conditions, the inward movement of bar 44 to the position shown in Fig. 6, causes the pin 47 to move out of the cam slot 53. As soon as the pin 47 is moved out of the cam slot, the latch 51 assumes the position shown in Fig. 6, provided, and only provided, that the lever of the ignition switch is in its "off" position.

The circuit diagram of Fig. 9 will be clear, without detailed description, to persons familiar with the electrical equipment of motor vehicles. Those parts of the circuit arrangement which are essential to the purposes of the present invention are indicated by the darker lines. The other features of the circuit arrangement shown may be varied within wide limits.

By "parking lights" as used in this specification, I mean the tail lamp and/or the cowl lamps and/or any other front or side lamps required to be lighted when the vehicle is parked at night.

The arrangement shown in Fig. 10 is or may be substantially identical with the arrangement shown in the preceding figures, except in this modification of the invention, the latch 51 is moved to non-locking position by means actuated by the running of the engine, as distinguished from means such as the switch lever which is actuated as an incident to the starting of the engine. In the arrangement of Fig. 10, reference numeral 60 indicates a cylinder which is supported adjacent the latch 51, as for instance by a bracket 61. Operating within the cylinder 60 is a piston 62 provided with a piston rod 63 operating through a stuffing box in the right hand end of the cylinder, the exposed end of the piston rod being adapted to engage the releasing arm 53 of the latch when the piston moves to the right. A light spring 64 normally urges the piston to the left. At 65 is indicated a tube which may be regarded as connecting the cylinder 60 with the intake manifold of the vehicle engine. It will thus be understood that every time the vehicle starts, a partial vacuum will be created in the cylinder 60 to move the piston to the right and thus to move the latch 51 to its non-locking position, provided it happens to be in its locking position when the engine commences to operate.

The piston 62 may, if desired, be operated by oil pressure created as an incident to the running of the engine, or the piston and cylinder may be replaced entirely by a solenoid or magnet, the core or armature of which will serve to move the latch 51 to non-locking position whenever the engine is running, provided, of course, the latch happens to be in its locking position at the time the operation of the engine begins. Such a solenoid or other magnet preferably would be connected across the terminals of the engine generator and be excited when and only when the engine is in operation.

Having thus illustrated and described my invention, what I claim as new and desire to secure by Letters Patent of the United States is:

1. In combination with the parking lamps of an automotive vehicle, time-controlled switching mechanism, a switch capable of manual actuation actuation to "set" position by the driver of the vehicle to place said lamps under the domination of said time-controlled switching mechanism, and devices necessarily operated as an incident to the use of the vehicle arranged to cooperate with said volitionally set switch and cause the latter to take said parking lamps from under the domination of said time-controlled switching mechanism.

2. A combination in accordance with claim 1 wherein the devices necessarily operated as an incident to use of the vehicle comprise a vacuum actuated member connected with the intake manifold of the vehicle engine and arranged when actuated to release the manually actuated switch from its "set" position.

3. A combination in accordance with claim 1 wherein the devices necessarily operated as an incident to use of the vehicle comprise the ignition switch of the engine, and instrumentalities actuated by the ignition switch for releasing the manually actuated switch from its "set" position when the ignition switch is operated to supply ignition current to the engine.

4. In combination with the parking lamps of an automotive vehicle, time-controlled switching mechanism, a manually operable reciprocating switch arranged when closed to place said lamps under the domination of said time-controlled switching mechanism, a spring tending to urge said reciprocating switch out of its closed position when placed therein, an automatic latch arranged to lock said reciprocating switch in its closed position when placed therein, and devices necessarily operated as an incident to use of the vehicle arranged to engage and move said latch to non-locking position and thereupon permit the opening of said reciprocating switch to take the lamps from under the domination of the time-controlled switching mechanism.

5. A combination in accordance with claim 4 wherein the devices necessarily operated as an incident to use of the vehicle comprise a vacuum actuated member connected with the intake manifold of the vehicle engine and arranged when actuated to move said latch from its locking position.

6. A combination in accordance with claim 4 wherein the devices necessarily operated as an incident to use of the vehicle comprise the ignition switch of the engine, and instrumentalities actuated by the ignition switch for moving said latch to its non-locking position when the ignition switch is operated to supply ignition current to the engine.

ALBERT G. McCALEB.